United States Patent [19]
Deleu

[11] 3,806,210
[45] Apr. 23, 1974

[54] BEARING STRUCTURE
[75] Inventor: Robert P. Deleu, South Bend, Ind.
[73] Assignee: Reliance Electric Company, Mishawaka, Ind.
[22] Filed: Mar. 24, 1972
[21] Appl. No.: 237,661

[52] U.S. Cl. ............................................. 308/127
[51] Int. Cl. ......................................... F16c 17/00
[58] Field of Search.................... 308/127, 128, 245

[56] References Cited
UNITED STATES PATENTS
| | | | |
|---|---|---|---|
| 1,272,493 | 7/1918 | Miller, Jr. | 308/128 |
| 2,008,581 | 7/1932 | Dennison et al. | 308/127 |
| 3,420,588 | 1/1969 | Kimberlin | 308/128 |
| 3,476,452 | 11/1969 | Hagg et al. | 308/127 |

Primary Examiner—Charles J. Myhre
Assistant Examiner—Frank Susko
Attorney, Agent, or Firm—Marmaduke A. Hobbs

[57] ABSTRACT

A bearing structure for a generally horizontally disposed rotatable shaft having a housing in which is disposed a plain bearing having one or more longitudinal grooves spaced upwardly from the bottom thereof and extending to one or both of the ends of the bearing for distributing the lubricant and diverting a portion thereof to the end of the bearing. The lower edge of the grooves is preferably tapered inwardly to enhance the distribution and diversion of the lubricant. Thrust collars are normally used on the ends of the bearings, and the spaces between the collars and the ends of the bearings are lubricated by the lubricant from the grooves.

6 Claims, 5 Drawing Figures

PATENTED APR 23 1974

BEARING STRUCTURE

A widely used type of pillow block is the split type consisting of upper and lower babbitt bearing sections supported by an inner assembly enclosed in a housing which forms the support for the bearing and a shaft journalled in the bearing and which normally contains a lubricant sump for lubricating the bearing sections and shaft. The lubricant is carried from the sump by oil rings to the upper part of the shaft in the bearing and is carried downwardly between the shaft and one side of the bearing section beneath the shaft, and is discharged through a horizontal space between the two bearing sections and returned to the sump. A thrust collar is normally secured to the shaft at one or both ends of the bearings, and, for the bearing to give optimum performance, the adjacent surfaces of the bearing end and side of the collar must be lubricated. In the past these surfaces have been lubricated by merely the seepage of the lubricant from the bearing, and since the flow of the lubricant in the conventional bearing is principally circumferential, the end surfaces of the bearing and collars have sometimes not been effectively lubricated. Further, since the source of the lubricant on the bearing is at the point where the rings contact the shaft, distribution of the lubricant in the bearing has not been uniform throughout the length of the bearing. It is therefore one of the principal objects of the present invention to provide a bearing structure of the aforesaid type which effectively distributes the lubricant throughout the bearing surfaces and which diverts and directs a substantial outflow of lubricant from the bearing to the ends thereof for lubricating the surfaces on the ends of the bearing and on the adjacent surface of the thrust collars.

Another object of the invention is to provide a bearing structure for controlling the flow of lubricant in and from the bearing, which is simple in construction and effective in operation, and which can be readily incorporated in standard plain babbitt bearings without changing the basic lubricating system for the bearing, shaft and thrust collars.

Still another object of the invention is to provide a lubricant distribution structure for a plain bearing of the aforesaid type which facilitates feeding the lubricant onto the bearing surfaces to effect optimum lubrication at the point or line of maximum pressure between the shaft and bearing, and which facilitates axial flow of the lubricant both fore and aft the point or line of maximum pressure.

Further objects and advantages of the present invention will become apparent from the following description and accompanying drawings, wherein.

Figure 1:
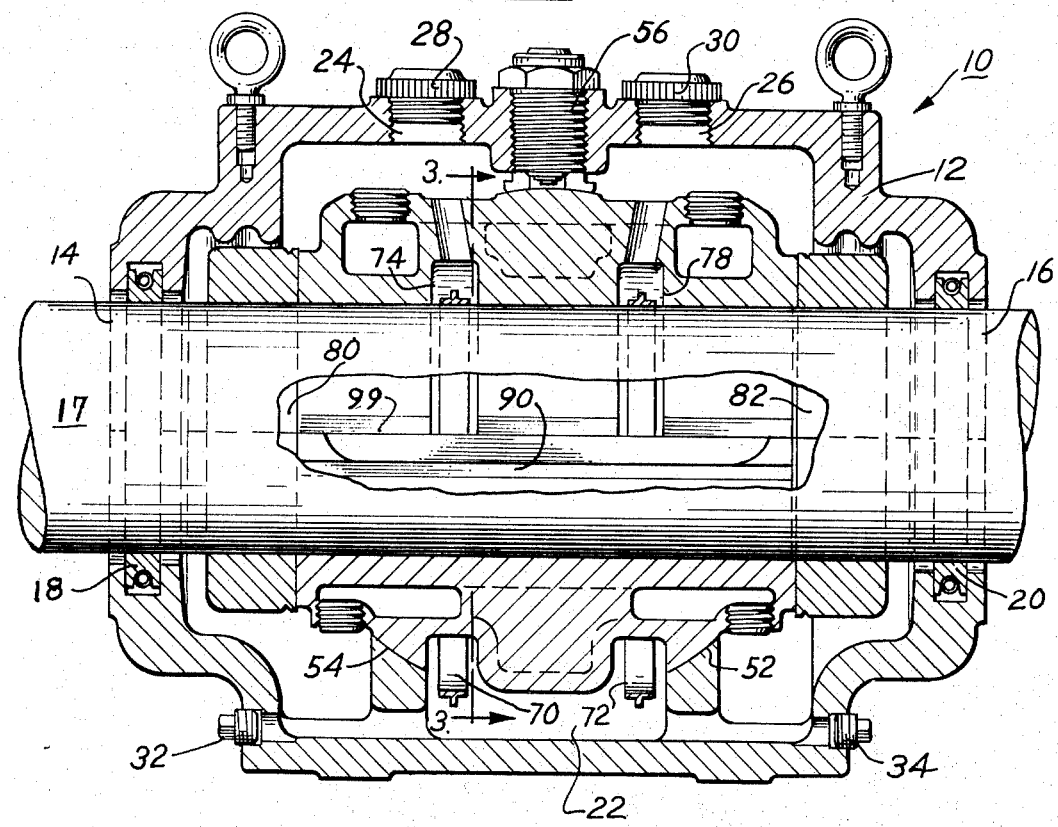
FIG. 1 is a vertical, axial, cross-sectional view of a pillow block embodying the present invention.

Referring more specifically to the drawings and to FIG. 1 in particular, numeral 10 indicates generally a pillow block embodying the present improvement and consisting of a housing 12 having axial openings 14 and 16 for receiving a shaft 17, the two openings being sealed when the shaft is journalled in the bearing by seals 18 and 20, respectively. The housing forms a lubricant sump 22 extending nearly the full length of the bottom of the housing and having filler openings 24 and 26 closed by screw-threaded plugs 28 and 30, and drain plugs 32 and 34 at opposite ends of sump 22.

The bearing body structure or assembly is indicated by numeral 40 and includes a body 42 having coolant passages therein connected to inlet pipes 44 and 46 and outlet pipes 48 and 50 for circulating a coolant through the body to control the temperature of the bearing element or liner indicated generally by numeral 60. The bearing body assembly is self-aligning and is supported in the housing by bosses 52 and 54 at the bottom and retainer and adjustment screw 56 at the top.

The bearing element 60 shown in the drawings is a sleeve or plain bearing consisting of upper and lower sections 62 and 64 disposed in the upper and lower halves of body 40 and held securely therein by a plurality of screws 66 connecting the upper and lower portions of the body. The bearing sections 62 and 64 may be made of bronze or cast iron with a babbitt facing, or any other suitable bearing material, and are lubricated by oil rings 70 and 72 disposed in slots 74 and 78 and resting on the shaft when the shaft is mounted or journalled in the bearing. The rings extend through the two slots downwardly into the lower portion of sump 22, and as the shaft rotates, the two oil rings likewise rotate, carrying oil from sump 22 to the shaft. The oil then flows downwardly between the shaft and the bearing elements, thus lubricating the surfaces of the bearing and shaft.

In the conventional bearing the lubricant, which is supplied to the shaft by the two rings 70 and 72, is not distributed effectively throughout the surface of the bearing or is not effectively supplied to the ends of the bearing where it is required to lubricate the contacting surfaces of the ends of the bearing and thrust collars 80 and 82. The two thrust collars are secured to the shaft by set screws or other suitable securing means and hence rotate with the shaft, and one or both of the collars bear against the end of the bearing elements as a result of axial thrust of the shaft.

The lower bearing section 64 is provided with longitudinal grooves 90 and 92, normally extending the full length of the bearing and opening at each end thereof. The lower edges 93 and 94 of each groove, respectively, are tapered for the purpose of facilitating the flow of oil into and/or from the two grooves. The two bearing sections are also tapered in the area adjacent their parting lines 97 and 98 on opposite sides of the bearing, forming slots 99 and 100 which assist in distributing or collecting the lubricant along the bearing.

Figure 2:
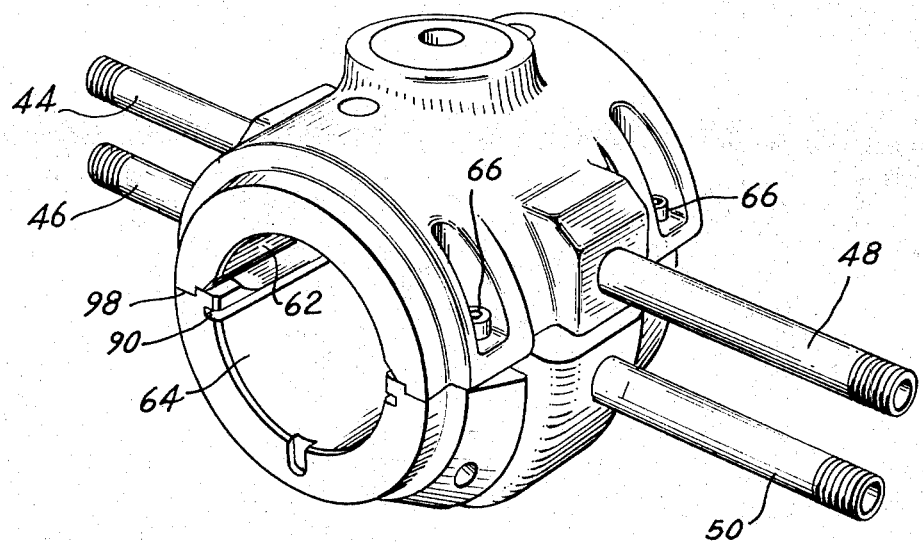
FIG. 2 is a perspective view of the internal bearing body structure removed from the housing shown in FIG. 1.
Figure 3:
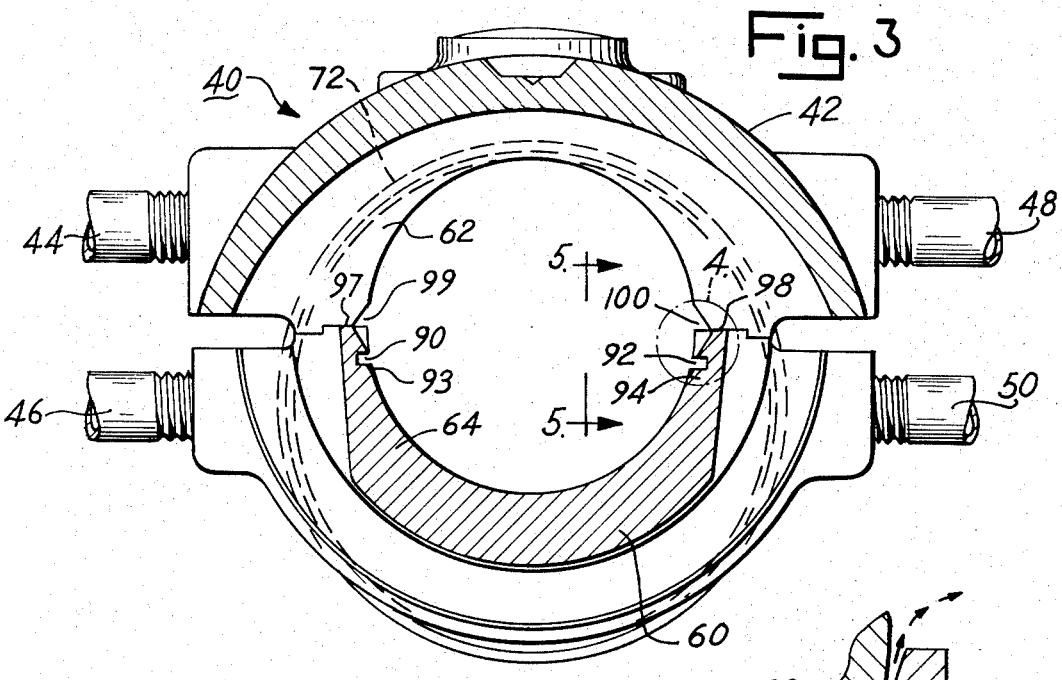
FIG. 3 is an axial, cross-sectional view of the structure shown in FIG. 2, the section being taken on line 3—3 of FIG. 1.
Figure 4:
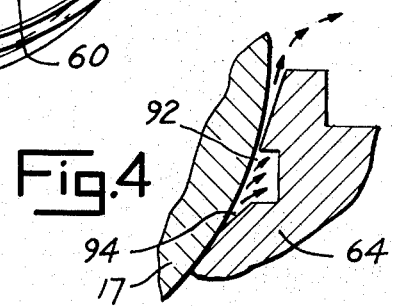
FIG. 4 is an enlarged, fragmentary cross-sectional view of the bearing structure shown in FIG. 3, the portion shown being indicated by the broken circle identified by numeral 4 in FIG. 3.

The shaft rotates, for example, in the counterclockwise direction as viewed in FIGS. 2 and 3, thus causing the lubricant to flow from the rings downwardly, on the left hand side as viewed in these figures, lubricating the bearing and shaft in the bearing section 64. The lubricant, which normally flows to the groove at the parting lines 97 and 98 of sections 62 and 64 and returns to the sump, is now diverted by groove 90 outwardly so that the lubricant is spread substantially uniformly along the surface of the shaft and the surface of the bearing before reaching the bottom of the bearing. As the shaft rotates, the lubricant is carried inwardly between the shaft and bearing and thence upwardly along the right hand side as viewed in FIGS. 2 and 3 until it reaches groove 92. As it enters this groove, the lubricant is again diverted outwardly toward the end of the bearing sections and in the space between the ends of the bearing and the adjacent sides of the two thrust collars 80 and 82, thus providing effective lubrication to the normally contacting surfaces at the end of the bearing and the collars. The lubricant then flows outwardly between the end of the bearing sections and the collars and drips back into sump 22 for recirculation into the bearing by the two oil rings. Any lubricant carried by the shaft upwardly above groove 92 is either recirculated or flows into the slot between the two parting lines of the bearing section and thence into the lower part of ring slots 74 and 78 and returns to the sump along the outer surface of the bearing body assembly.

Figure 5:
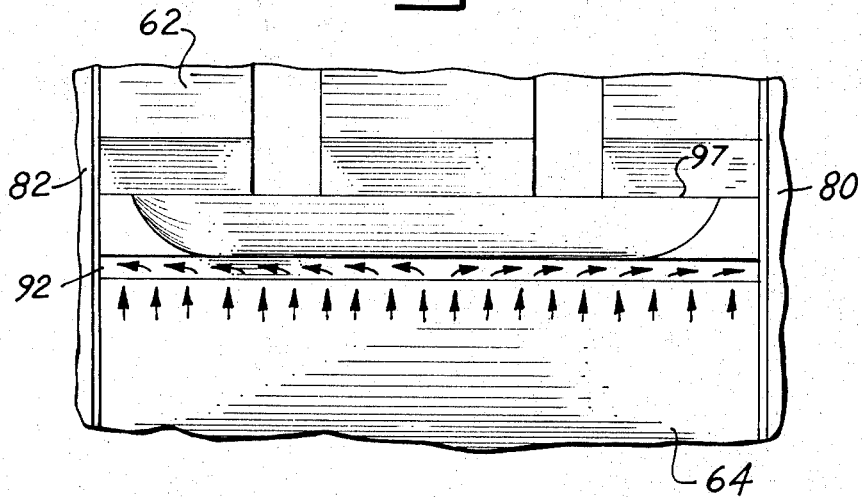
FIG. 5 is a fragmentary internal elevational view of the bearing structure, the view being indicated by the lines 5—5 of FIG. 3.

The shape and construction of the groove structures 90 and 92 are the same on both sides of bearing section 64, and hence, regardless of which direction the shaft is rotating, one groove 90 or 92 feeds and effectively distributes the lubricant to the shaft and bearing as the surface of the shaft is moving downwardly, and the other groove effectively diverts the lubricant as the surface of the shaft is moving upwardly to and past the groove. The arrows on FIG. 5 illustrate the manner in which the lubricant flows from the shaft and bearing surfaces into groove 92 and outwardly through the groove to the end of the bearing element to the space between collars 80 and 82 and the respective ends of the bearing. Thus the surfaces at the ends of the bearing and the adjacent sides of the collars are effectively and continuously lubricated as the lubricant flows from the ends of the grooves and thence back to the sump. The grooves may be located upwardly or downwardly from the position shown, and the lower edge thereof may be tapered more or less, or provided with a curvature on a radius substantially the same as that of the bearing section. Normally, one or both of grooves 90 and 92 extend the full length of the bearing element and are open at both ends; however, when only one thrust collar is used, one or both of grooves 90 and 92 may extend only to the end having the collar, since lubrication is not required at the end without the thrust bearing.

While only one embodiment of the present bearing structure has been described in detail herein, various changes and modifications may be made without departing from the scope of the invention.

I claim:

1. A bearing structure for a generally horizontal rotatable shaft, comprising a sleeve bearing element for journalling the shaft, said element having upper and lower bearing sections and a parting line therebetween, a means for supplying a liquid lubricant to the shaft above the center and inwardly from the ends thereof, a means forming a longitudinal groove in the bearing surface of said lower section and extending to both ends thereof and being spaced upwardly from the bottom of said lower section on one side thereof, said groove being substantially straight and continuous and generally parallel with and in close proximity to the adjacent parting line but spaced therefrom whereby the groove forms a receptacle which substantially intercepts the upward movement of the lubrican and diverts the lubricant laterally to the ends of the groove.

2. A bearing structure for a shaft as defined in claim 1 in which the lower edge of said groove is tapered inwardly.

3. A bearing structure for a shaft as defined in claim 1 in which a second longitudinal groove is disposed in the bearing element surface and extends to at least one end thereof and in which said second groove is disposed upwardly from the bottom of the lower bearing section on the side opposite said first mentioned groove.

4. A bearing structure for a shaft as defined in claim 3 in which the lower edge of said second mentioned groove is tapered inwardly.

5. A bearing structure for a shaft as defined in claim 3 in which said second mentioned groove extends to both ends of said bearing element.

6. A bearing structure for a shaft as defined in claim 3 in which said grooves extend to both ends of said lower bearing section.

* * * * *